US007832099B2

(12) United States Patent
Sumi et al.

(10) Patent No.: US 7,832,099 B2
(45) Date of Patent: Nov. 16, 2010

(54) METHOD OF MANUFACTURING A WIRING MATERIAL

(75) Inventors: Toru Sumi, Hitachi (JP); Tsukasa Iwasita, Hitachi (JP); Kenichi Egami, Kitaibaraki (JP); Kazuyuki Watanabe, Hitachi (JP); Hiroshi Okikawa, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 403 days.

(21) Appl. No.: 11/792,839

(22) PCT Filed: Dec. 9, 2005

(86) PCT No.: PCT/JP2005/022693

§ 371 (c)(1),
(2), (4) Date: Oct. 2, 2007

(87) PCT Pub. No.: WO2006/062203

PCT Pub. Date: Jun. 15, 2006

(65) Prior Publication Data

US 2008/0081499 A1 Apr. 3, 2008

(30) Foreign Application Priority Data

Dec. 10, 2004 (JP) ............................ 2004-358648
Dec. 8, 2005 (JP) ............................ 2005-355237

(51) Int. Cl.
*H01R 43/02* (2006.01)
*B23K 11/00* (2006.01)

(52) U.S. Cl. ............................ 29/860; 29/856; 29/858; 29/861; 29/866; 219/56

(58) Field of Classification Search .................. 29/860, 29/866, 856, 858, 523, 511; 439/207, 208, 439/210; 219/56, 56.1, 57, 60.2, 61.6, 607, 219/629, 643; 174/88, 78
See application file for complete search history.

(56) References Cited

U.S. PATENT DOCUMENTS 3,999,035 A * 12/1976 Miyao et al. ............ 219/137 R
4,317,277 A * 3/1982 Bennett et al. ................ 29/860

(Continued)

FOREIGN PATENT DOCUMENTS

JP 52-138037 11/1977

(Continued)

OTHER PUBLICATIONS

Japanese Official Action dated Jun. 8, 2010 together with an English language translation.

*Primary Examiner*—Derris H Banks
*Assistant Examiner*—Tai Nguyen
(74) *Attorney, Agent, or Firm*—Scully, Scott, Murphy & Presser, P.C.

(57) ABSTRACT

A wiring material is provided by electrically connecting a connecting terminal with two single line conductors arranged in parallel. The connecting terminal is provided with a tube-shaped section for storing two single line conductors, the two single line conductors are inserted into the tube-shaped section, resistance welding is performed by carrying electricity from the external of the tube-shaped section in a status where the tube-shaped section and the single line conductors are mutually brought into contact, and the connecting terminal is electrically connected with the two single line conductors.

4 Claims, 14 Drawing Sheets

U.S. PATENT DOCUMENTS

| | | | | |
|---|---|---|---|---|
| 4,902,867 | A * | 2/1990 | Haramaki et al. | 219/85.18 |
| 5,416,268 | A * | 5/1995 | Ellis | 174/36 |
| 5,739,496 | A * | 4/1998 | Asakura et al. | 219/56.22 |
| 6,369,474 | B1 | 4/2002 | Tanaka et al. | |
| 2003/0173842 | A1 | 9/2003 | Kobayashi et al. | |
| 2004/0070293 | A1 | 4/2004 | Kabasawa et al. | |
| 2006/0138884 | A1 | 6/2006 | Kabasawa et al. | |

FOREIGN PATENT DOCUMENTS

| | | |
|---|---|---|
| JP | 4-95372 | 3/1992 |
| JP | 05-114450 | 5/1993 |
| JP | 05-168187 | 7/1993 |
| JP | 2004-96841 | 3/1994 |
| JP | 06-267595 | 9/1994 |
| JP | 08-132245 | 5/1996 |
| JP | 11-299159 | 10/1999 |
| JP | 2001-025198 | 1/2001 |
| JP | 2001-231209 | 8/2001 |
| JP | 2002-075481 | 3/2002 |
| JP | 2003-134724 | 5/2003 |

* cited by examiner

METHOD OF MANUFACTURING A WIRING MATERIAL

FIELD OF THE INVENTION

The present invention relates to wiring material, method for manufacturing such wiring material and resistance welding apparatus used in such manufacturing method to be used for vehicle apparatuses, and more particularly, to wiring material, method for manufacturing such wiring material and resistance welding apparatus used in such manufacturing method with the use of an insulation-coated single line conductor.

BACKGROUND OF THE INVENTION

As a cable for vehicle, there is a wiring material for feeding to a stator coil of a motor, for example. Conventionally, the wiring material is manufactured by extending enamel wires wound around a stator core to a feeding section, bundling plural enamel wires, and connecting a bundle of enamel wires to the feeding section by TIG (Tungsten Inert Gas) welding or soldering.

In accordance with spread of hybrid vehicles and advance in electrification of apparatuses, higher voltage is applied to and higher current is flown in the wiring material and the motor is provided with higher output power and larger-size. Compared with the conventional device, the number of stator coils in the motor is increased, and a time required for connecting the enamel wires is increased in assembling process of the motor. Accordingly, the assembling process of the motor is required to be simplified, so that it was necessary to improve a bonding method of the enamel wire.

Thus, a technique, in which a stator coil comprising enamel wires wound around a stator core is installed in a stator housing and the enamel wires and a wiring material are connected with each other, is used (see, for example, Patent document 1 and patent document 2). For such a wiring material, there is a wiring material fabricated by punching a copper plate to have a predetermined shape (circular shape), integrally molding one set of two or three copper plates formed to have the predetermined shape by resin mold, and provide an insulation coating thereon. According to this, it is possible to reduce a space and to improve mechanization in installation of the wiring material or the like and to improve the workability in attachment.

However, in the case where the wiring material is fabricated by punching the copper plate, there is a disadvantage in that material cost becomes high due to a lot of needless parts formed by punching to have the circular shape. Further, the process becomes complicated since the step of integrally molding one set of two or three copper plates by resin mold is required. Still further, there is another disadvantage in that bad insulation occurs due to cracks in a resin mold part by a thermal fatigue due to difference in thermal expansion coefficient between a ring and the resin mold, oscillation, or the like.

Accordingly, in these days, there is a method of fabricating a wiring material by bending a linear conductor (single line conductor) coated with an insulator, in place of the method of fabricating a wiring material by punching a copper plate (For example, see Patent document 4).

When the wiring material is fabricated by this fabrication method, there is an advantage in that material cost is less expensive than the punching method in which the unnecessary parts are generated, since the linear conductor is processed by bending. In addition, there is another advantage in that electrical insulation between the linear conductors is ensured by bending the linear conductor that is previously insulation-coated, so that the step of molding the whole of the ring is unnecessary.

On the other hand, in the method of fabricating the wiring material by punching the copper plate, a feeding terminal can be also formed by punching in the process of punching in the circular shape, however, in the method of fabricating the wiring material by bending the linear conductor coated with the insulator, the feeding terminal should be prepared separately and the feeding terminal and a tip portion of the linear conductor is required to be electrically connected with each other by pressure connection.

Conventionally, when a pressure connection terminal is employed as a terminal bonding method of the single line conductor, soldering or brazing is conducted after the pressure connection, since reliability is poor when only the pressure connection is used.

In addition, as a bonding method of connecting the insulation coated conductor with a conductor terminal, a method of inserting an insulation-coated conductor into a conductor terminal, sandwiching it by a pair of electrodes to be pressured and energized is known (see Patent document 5 and Patent document 6).

Patent document 1: Japanese Patent Laid-Open No. 11-299159

Patent document 2: Japanese Patent Laid-Open No. 2001-25198

Patent document 3: Japanese Patent Laid-Open No. 2003-134724

Patent document 4: Japanese Patent Laid-Open No. 2004-96841

Patent document 5: Japanese Patent Laid-Open No. 5-114450

Patent document 6: Japanese Patent Laid-Open No. 2002-75481

DISCLOSURE OF THE INVENTION

Problems to be Solved by the Invention

However, since it is difficult to automate the soldering and brazing, it is inevitable to conduct manually these works. In the hand work, it is difficult to keep a weight of solder or brazing filler metal and bonding work time constant, and it is difficult to realize a connection reliability uniformly. In addition, when the wiring material is installed in the vehicles, cracking is concerned since the thermal fatigue, oscillation or the like is applied to the connector section.

When the wiring material is the wiring material for the motor as described above and the single line conductor in the wiring material is connected by soldering, the aforementioned problem may occur. In addition, when the single line conductor in the wiring material is connected by TIG welding, there is a possibility of causing a failure due to the thermal effect on the connector section and hydrogen embrittlement of the melting section.

Further, the bonding method disclosed by Patent document 5 is the method in which a bonding assistance material is indispensable, and the bonding method disclosed by Patent document 6 does not disclose the terminal bonding method for the single line conductor.

Accordingly, it was necessary to develop a wiring material in which bonding property of the connector section is uniform, reliability of the connector section is high, and durability for the thermal fatigue, oscillation or the like is high.

Accordingly, it is an object of the invention to provide a wiring material in which the bonding property of the connector section between the single line conductor and the connecting terminal is uniform, and that has a high connection reliability.

Means for Solving the Problems

According to the present invention, so as to realize the above objects, a wiring material comprises:

a connecting terminal electrically connected to two single line conductors provided in parallel;

wherein a tube-shaped section for accommodating the two single line conductors at the connecting terminal is formed, the two single line conductors are inserted into the tube-shaped section, the resistance welding is conducted by energizing from an outer periphery of the tube-shaped section in a state where the tube-shaped section an the single line conductors are in contact with each other to electrically connect the connecting terminal with the two single line conductors.

According to the present invention, so as to realize the above objects, a wiring material comprises:

a connecting terminal electrically connected to two single line conductors provided in parallel;

wherein the connecting terminal comprises a tube-shaped section, the two single line conductors are interposed in an inner periphery of the tube-shaped section, and the connecting terminal and the two single line conductors are electrically connected with each other via a resistance welding section.

According to the present invention, so as to realize the above objects, a wiring material comprises:

a connecting terminal electrically connected to a circular shaped single line conductor;

wherein the circular shaped single line conductor comprises both ends extending in parallel, the connecting terminal comprises a tube-shaped section, the both ends of the circular shaped single line conductor are interposed in an inner periphery of the tube-shaped section, and the connecting terminal and the both ends of the single line conductor are electrically connected with each other via a resistance welding section.

Preferably, the tube-shaped section of the connecting terminal has a crush process section at least at a part of its outer periphery surface.

The crush process section may be a concave portion presenting a cylindrical shape.

The crush process section may be a concave portion presenting a rectangular body shape.

The crush process section may be a concave portion which presents a substantially ellipse cylindrical shape.

The concave portion may be extended along a longitudinal direction of the single line conductor.

The concave portion may be extended along a direction perpendicular to a longitudinal direction of the single line conductor.

Preferably, the tube-shaped section of the connecting terminal has an approximately elliptical shape, and a length of its inner periphery portion along a minor axis direction is approximately equal to an outer diameter of the single line conductor.

Preferably, the single line conductor comprises copper or copper alloy having a Sn-plating at its outer periphery portion.

Preferably, the tube-shaped section of the connecting terminal comprises copper or copper alloy having a Sn-plating at its inner periphery portion.

Preferably, the resistance welding section is formed of a melting portion of a Sn-plating layer of the connecting terminal and a Sn-plating layer of the two single line conductors.

Preferably, the resistance welding section is formed of a melting portion of a Sn-plating layer of the connecting terminal and a Sn-plating layer of the both ends of the single line conductor.

According to the present invention, so as to realize the above objects, a method of manufacturing a wiring material having a connecting terminal electrically connected to two single line conductors provided in parallel comprises the steps of:

forming a tube-shaped section for accommodating the two single line conductors at the connecting terminal;

inserting the two single line conductors into the tube-shaped section; and conducting a resistance welding in a state where an inner periphery portion of the tube-shaped section an the single line conductors are in contact with each other by energizing from an outer periphery of the tube-shaped section to electrically connect the connecting terminal with the two single line conductors.

Preferably, the resistance welding is conducted by energizing by a pair of electrodes from the outer periphery of the tube-shaped section, and a tip angle of any one or both of the pair of the electrodes is from 60° to 90°.

Preferably, a round-shape at a tip portion of any one or both of the pair of the electrodes is from 1.25 mm to 3 mm.

Preferably, the method further comprises the step of:

conducting a crush process on the tube-shaped section of the connecting terminal, to contact an inner periphery of the tube-shaped section and the two single line conductors with each other.

Preferably, the crush process is conducted such that an upper portion of the tube-shaped section of the connecting terminal contacts with a concave portion formed between the two single line conductors and contacts along a longitudinal direction of the two single line conductors.

Preferably, the method further comprises the step of:

conducting a crush process to press the tube-shaped section of the connecting terminal along a direction perpendicular to the longitudinal direction of the two single line conductors.

According to the present invention, so as to realize the above objects, a method of manufacturing a wiring material having a connecting terminal electrically connected to a circular shaped single line conductor, comprises the steps of:

bending a single line conductor to have a circular shape;

extending both ends of the single line conductor that is bent in parallel;

forming a tube-shaped section at the connecting terminal for accommodating the both ends of the single line conductor;

interposing the both ends of the single line conductor into the tube-shaped section; and energizing the tube-shaped section from its outer periphery in a state where an inner periphery surface of the tube-shaped section contacts with the both ends of the single line conductor to electrically connect the connecting terminal with the both ends of the single line conductor.

Preferably, the resistance welding is conducted by energizing by a pair of electrodes from the outer periphery of the tube-shaped section, and a tip angle of any one or both of the pair of the electrodes is from 60° to 90°.

Preferably, a round-shape at a tip portion of any one or both of the pair of the electrodes is from 1.25 mm to 3 mm.

Preferably, the method further comprises the step of:

conducting a crush process on the tube-shaped section of the connecting terminal, to contact an inner periphery of the tube-shaped section and the both ends of the single line conductor with each other.

Preferably, the crush process is conducted such that an upper portion of the tube-shaped section of the connecting terminal contacts with a concave portion formed between the both ends of the two single line conductors and contacts along a longitudinal direction of the two single line conductors.

Preferably, the method further comprises the step of:

conducting a crush process to press the tube-shaped section of the connecting terminal along a direction perpendicular to the longitudinal direction of the two single line conductors.

According to the present invention, so as to realize the above objects, a resistance welding apparatus comprises:

a pair of welding electrode;

wherein a round-shape at a tip portion of any one or both of the pair of the welding electrodes is from 1.25 mm to 3 mm, and a round-shape at a tip portion thereof is from 1.25 mm to 3 mm.

The present invention is based on Japanese Patent Application Nos. 2004-358648 and 2005-355237, and entire contents thereof are incorporated herein by reference.

EFFECTS OF THE INVENTION

According to the present invention, it is possible to provide the wiring material with high connection reliability in which the bonding property of the connector section between the single line conductor and the connecting terminal is uniform.

BEST MODE FOR CARRYING OUT THE INVENTION

The First Preferred Embodiment

Structure of Wiring Material

Figure 1:
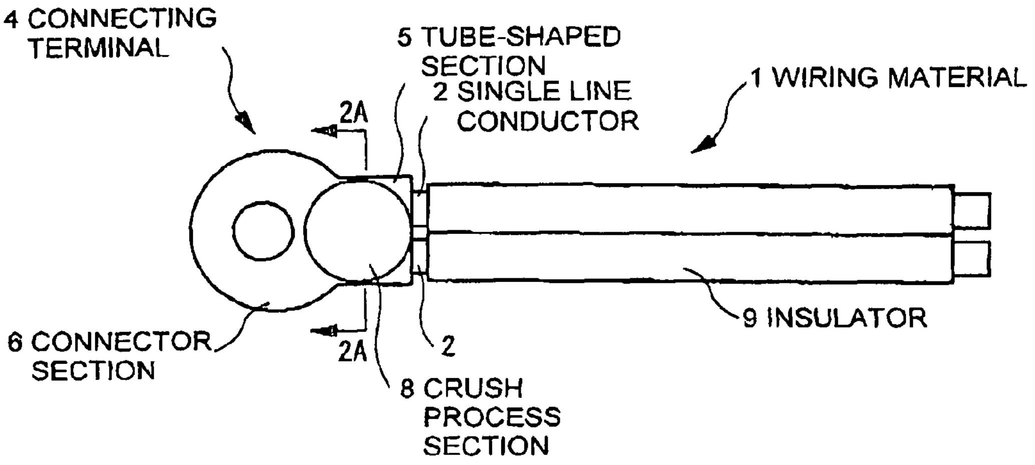
FIG. 1 is a plan view of a wiring material in a first preferred embodiment according to the present invention.
Figure 2:
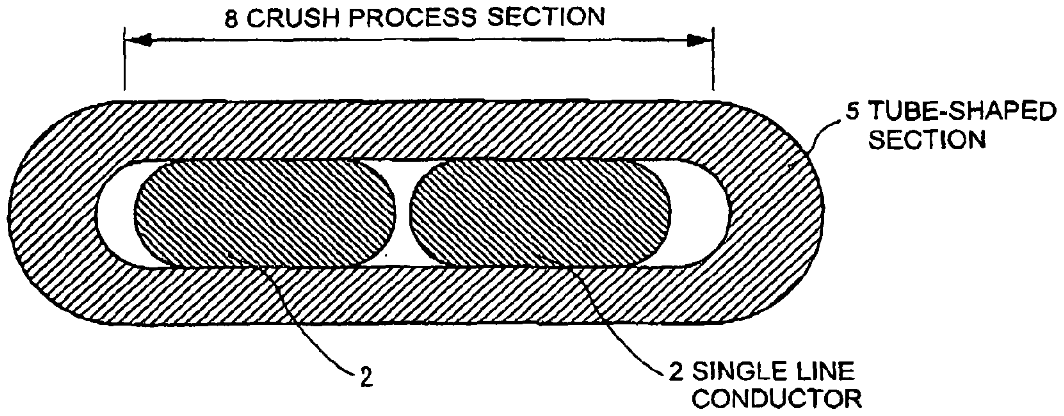
FIG. 2 is a cross sectional view of the wiring material cut along 2A-2A line of FIG. 1 (only the cross section is shown)

Based on FIGS. 1 and 2, a structure of a wiring material in the first preferred embodiment will be explained. FIG. 1 is a plan view of the wiring material in the first preferred embodiment according to the present invention. In addition, FIG. 2 is a cross sectional view of the wiring material cut along 2A-2A of FIG. 1 (only the cross section is shown).

A wiring material 1 in this preferred embodiment comprises two single line conductors 2, 2 provided in parallel, and a connecting terminal 4 electrically connected to the single line conductors 2, 2.

Each of the single line conductors 2, 2 comprises a single wire of metal. In more concrete, each of the single line conductors 2, 2 comprises copper or copper alloy on which Sn-plating is provided. For example, the copper alloy is copper-tin alloy. The single line conductors 2, 2 in this preferred embodiment are coated with an insulator 9, however there is also a case where the single line conductors 2, 2 are not jacketed.

The connecting terminal 4 is composed of, for example, copper or copper alloy, and comprises a tube-shaped section 5 connected to the single line conductors 2, 2 and, a connector section 6 connected to a feeding side. For the copper alloy, copper-tin alloy may be used for example. An inner periphery portion of the tube-shaped section 5 is preferably provided with Sn-plating, for example.

The two single line conductors 2, 2 are interposed in the inner periphery portion of the tube-shaped section 5. The two single line conductor 2, 2 are joined each other by the Sn-plating melt by the resistance welding. In addition, the tube-shaped section 5 and the single line conductors 2, 2 are joined with each other by Sn-plating of the single line conductors 2, 2 melt by resistance welding. The connecting terminal 4 (tube-shaped section 5) and each single line conductor 2 are electrically connected by this process.

At an upper surface side of the tube-shaped section 5, a pressure connection mark (crush process section) 8 generated by crush process is formed. The pressure connection mark 8 is a concave portion having a substantially circular plan view and showing a cylindrical configuration. In addition, the pressure connection mark 8 in this preferred embodiment is slightly concave however the degree of concaveness of the pressure connection mark is not limited thereto.

Each of the single line conductors 2 and the tube-shaped section 5 are joined by pressure connection and resistance welding. In other words, the connecting terminal 4 in this preferred embodiment functions as a pressure connection terminal.

(Manufacturing Method of the Wiring Material)

Next, based on FIGS. 3 to 8, a manufacturing method of the wiring material in the first preferred embodiment will be explained.

The manufacturing method of the wiring material 1 in this preferred embodiment comprises the steps of forming a tube-shaped section 5 for accommodating two single line conductors 2, 2 at a connecting terminal 4, inserting the two single line conductors 2, 2 into the tube-shaped section 5, and conducting the resistance welding by energizing from an outer periphery of the tube-shaped section 5 in a state where the two single line conductors 2, 2 and an inner periphery surface of the tube-shaped section 5 are in contact with each other to electrically connect the connecting terminal 4 with the two single line conductors 2, 2.

Figure 3:
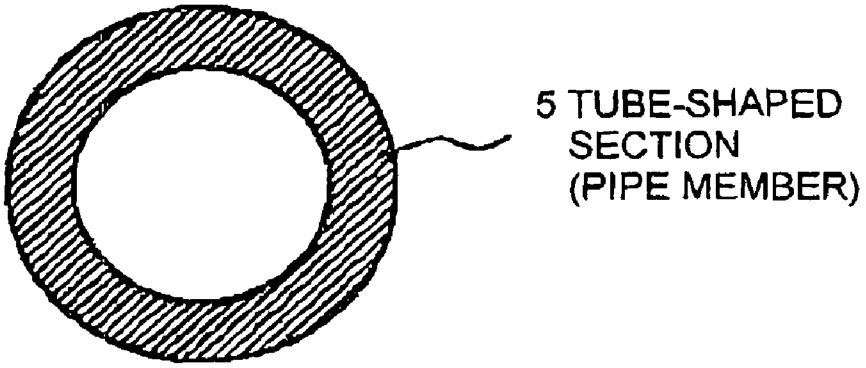
FIG. 3 is a cross sectional view of a connecting terminal constituting the wiring material in the first preferred embodiment, which shows a tube-shaped section before press-molding.
Figure 4:
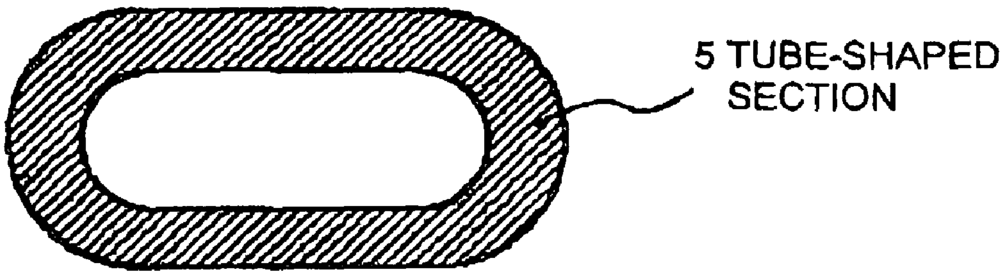
FIG. 4 is a cross sectional view of a connecting terminal constituting the wiring material in the first preferred embodiment, which shows a tube-shaped section after press-molding.
Figure 5A:
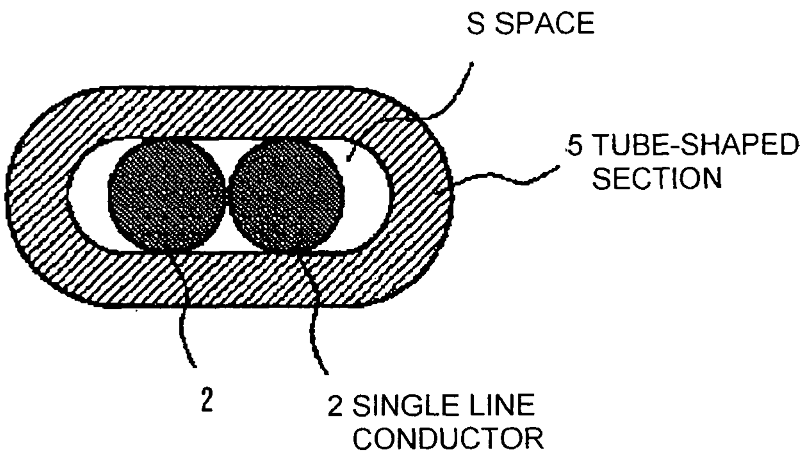
FIGS. 5A and 5B are cross sectional views of a connecting terminal and a single line conductor constituting the wiring material in the first preferred embodiment.
Figure 5B:
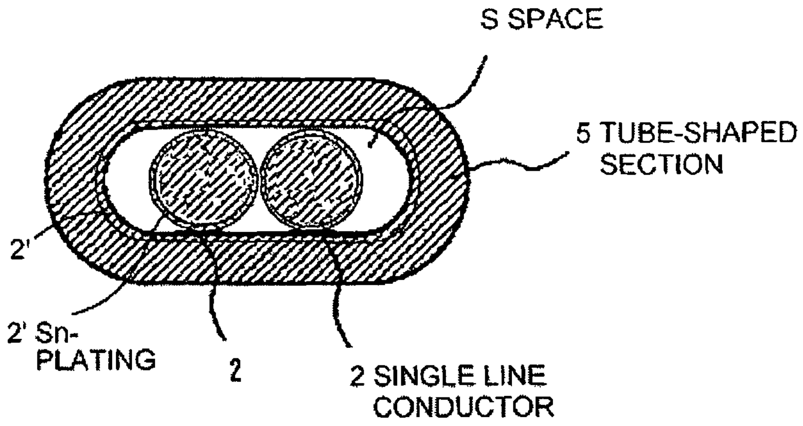
Figure 6:
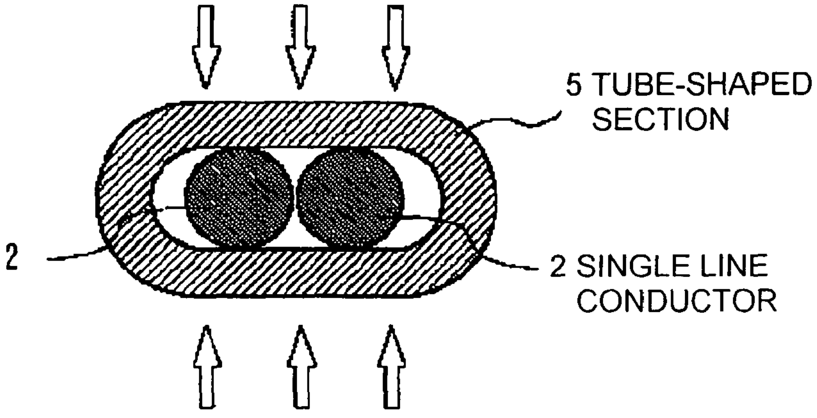
FIG. 6 is a cross sectional view of a connecting terminal and a single line conductor constituting the wiring material in the first preferred embodiment.

Referring to FIGS. 3 to 6, the steps of forming the tube-shaped section 5 at the connecting terminal 4 and inserting the two single line conductors 2, 2 into the tube-shaped section 5 will be explained. FIG. 3 is a cross sectional view of the connecting terminal constituting the wiring material in the first preferred embodiment, which shows the tube-shaped section before press-molding. FIG. 4 is a cross sectional view of the connecting terminal constituting the wiring material in the first preferred embodiment, which shows the tube-shaped section after press-molding. In addition, FIGS. 5A, 5B and 6 are cross sectional views of the connecting terminal and the single line conductors constituting the wiring material in the first preferred embodiment.

At first, a copper or copper alloy wire is prepared and Sn-plating is provided on the copper or copper alloy to form the single line conductor 2. For example, a diameter of the copper or copper alloy wire is 2.6 mm, and a Sn-plating layer is formed to have a thickness of 0.5 μm.

Further, an insulator 9 is jacketed on the Sn-plating layer around the copper or copper alloy wire. For example, PFA (perfluoroalcoxy) is used for the insulator (insulating material) 9, and the PFA is provided as an insulation coating with a thickness of 0.3 mm.

The insulator 9 at the tip portion of the insulation jacketed copper or copper alloy wire is peeled off to expose the conductor. For example, a terminal part of the insulator 9 is peeled off along a length of around 13 mm.

Next, as shown in FIG. 3, a pipe member composed of copper or copper alloy having a true circle cross section is prepared. A tube-shaped section 5 of a connecting terminal 4 is formed of the pipe member. For example, a diameter of an opening of the pipe member is 3.4 mm.

Next, as shown in FIG. 4, the tube-shaped section 5 of the connecting terminal 4 is press-molded. The press-molded tube-shaped section 5 has a substantially oval cross section, and a length of the inner periphery portion in a minor axis direction is formed to be approximately the same as an outer diameter of the single line conductor 2. In more concrete, the tube-shaped section 5 is formed to have the approximately elliptical cross section such that un upper face and a lower face are flat respectively and are parallel to each other.

Herein, when a diameter of the opening of the tube-shaped section 5 before press-molding is greater than a sum of diameters of two single line conductors 2, 2, the two single line conductors 2, 2 can be inserted into the tube-shaped section 5 without press-molding of the tube-shaped section 5. However, a gap may be formed between the tube-shaped section 5 and the single line conductors 2, 2, so that there is a risk that the single line conductors 2, 2 will be dropped off from the tube-shaped section 5. Further, in the resistance welding to be conducted later, there is a risk that the tube-shaped section 5 will spread in a lateral direction when the tube-shaped section 5 is crushed, so that metal joint points between the tube-shaped section 5 and the single line conductor 2 may be reduced. Therefore, the press-molding is conducted such that the two single line conductors 2, 2 can be inserted in parallel. By this press-molding, a space S (see FIG. 5) formed by the single line conductors 2, 2 and the tube-shaped section 5 can be further reduced.

Next, as shown in FIG. 5A, the two single line conductors 2, 2 arranged in parallel are inserted into the tube-shaped section 5 through the opening of the tube-shaped section 5. As shown in FIG. 5B, a Sn-plating 2' may be provided at an outer periphery portion of the single line conductor 2 and the Sn-plating 2 may be provided at an inner periphery part of the tube-shaped section 5 of the connecting terminal 4. At this time, as shown in FIG. 6, it is preferable to sandwich and compress the tube-shaped section 5 in a state where the single line conductors 2, 2 are inserted into the tube-shaped section 5, so as to slightly flatten the single line conductors 2, 2, such that a relative position of the connecting terminal 4 and the single line conductors 2, 2 will not be shifted.

Figure 7:
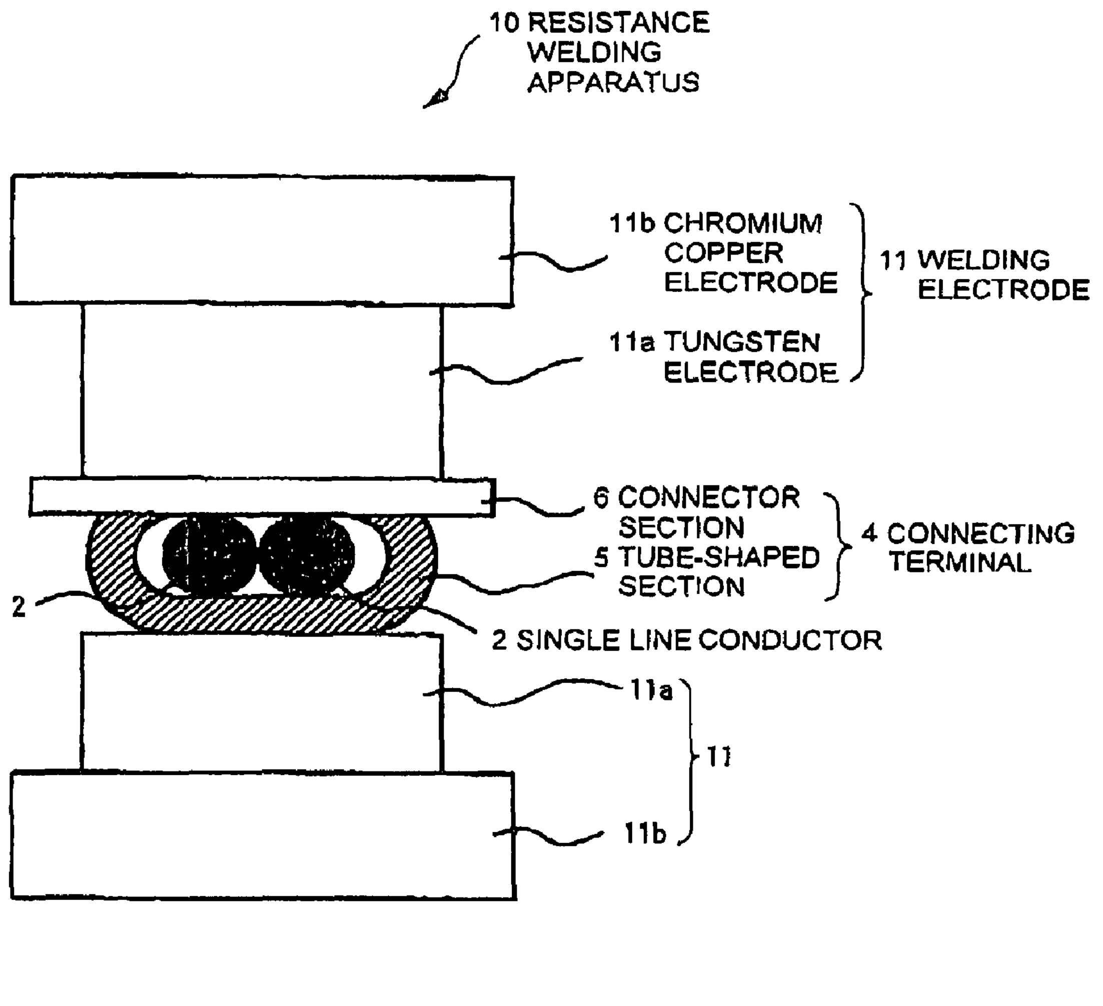
FIG. 7 is a front view of a resistance welding apparatus used for manufacturing the wiring material in the first preferred embodiment.

Next, referring to FIGS. 7 and 8, the resistance welding process will be explained. FIG. 7 is a front view of a resistance welding apparatus used for manufacturing the wiring material in the first preferred embodiment, and FIG. 8 is a side view thereof.

Figure 8:
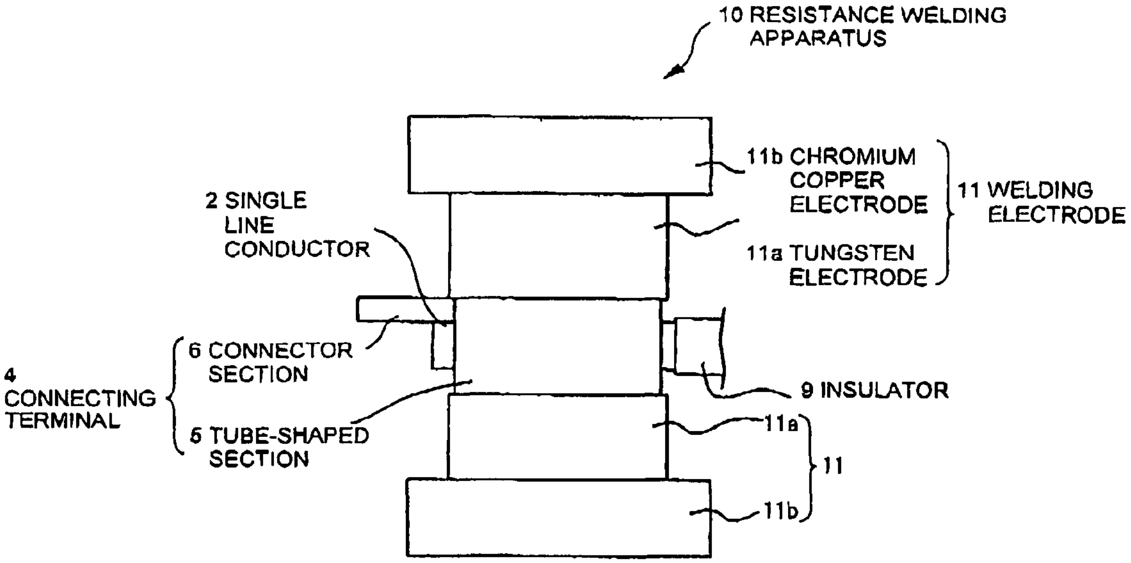
FIG. 8 is a side view of the resistance welding apparatus in FIG. 7.

As shown in FIGS. 7 and 8, the resistance welding apparatus used for the resistance welding comprises a pair of upper and lower welding electrodes (hereinafter, referred as "electrodes") 11, 11. Each of the electrodes 11 has a cylindrical shape extended along a vertical direction, and a diameter thereof is f 10 mm and length thereof is 25 mm, for example.

As for the electrode 11, a tungsten electrode may be used for example. The tungsten electrode itself generates a heat and assists in the welding, when it is difficult to conduct the welding only by the heat generated from a contact resistance between the electrode and an object to be welded, or a contact resistance between objects to be welded, when an electric current is flown through the tungsten electrode. In this preferred embodiment, the electrode 11 prepared by embedding a tungsten electrode 11*a* in a chromium copper electrode 11*b* to be integrated is used. This integrated electrode 11 has a configuration, in that the chromium copper electrode 11*b* can be cooled by supplying a cooling water, so as to avoid that the temperature is excessively elevated when the tungsten electrode 11 generates the heat.

For conducting the resistance welding, a connecting terminal 4, into which the single line conductor 2, 2 are introduced, is positioned with respect to the electrodes 11, 11 of a resistance welding apparatus 10. Then, the tube-shaped section 5 is sandwiched by the electrodes 11 from top and bottom, and energized while pressurizing the tube-shaped section 5 by the electrodes 11, 11. By this electrification, the single line conductors 2, 2 and the tube-shaped section 5 generate the heat so that a Sn-plating at a surface of the single line conductors 2, 2 is melt. By this melting Sn-plating, the single line conductors 2, 2 are joined to each other, and the single line conductors 2, 2 and the tube-shaped section 5 are joined. This joint part is a resistance welding section. In this preferred embodiment, the single line conductors 2, 2 and the metal (copper or copper alloy) itself of the connecting terminal 4 are melt, and an electrification current value, a resistance welding time or the like are set appropriately such that only Sn-plating is melt.

In addition, the tube-shaped section 5 of the connecting terminal 4 is crush processed by applying a pressure in the resistance welding. Since the upper and lower electrodes 11, 11 sandwich the tube-shaped section 5 from top and bottom in the crush process, an upper surface and a lower surface of the tube-shaped section 5 deform plastically, and the tube-shaped section 5 and the single line conductor 2 in a line contact state as shown in FIG. 6 become to a face contact state as shown in FIG. 2. The crush process section (pressure connection mark) 8 is formed by this crush process, and an inner periphery of tube-shaped section 5 comes in face contact with the two single line conductors 2, 2.

Effect of this Preferred Embodiment (1) By conducting the crush process of the tube-shaped section 5 as described above, a contact area between the single line conductors 2, 2 and the tube-shaped section 5 increases, so that an electrical connecting property between the single line conductors 2, 2 and the tube-shaped section 5 can be improved.

(2) The outer periphery portions of the single line conductors 2, 2 and the inner periphery portion of the tube-shaped section 5 are joined by fusion by partially melting the Sn-plating of the outer periphery portion of the single line conductors 2, 2, so that the single line conductors 2, 2 and the whole of the connecting terminal 4 will not be exposed to the high temperature. Therefore, a region affected by a heat due to the resistance welding will not give bad influences (for example, deformation of the connector section 6) on the single line conductors 2, 2 and the connecting terminal 4.

(3) By connecting the single line conductors 2, 2 with the connecting terminal 4 by the resistance welding, in a case where the wiring material 1 is mass-fabricated in a manufacture line, for example, the single line conductors 2, 2 of each of the wiring material 1 and the connecting terminal 4 can be welded in a completely same condition, so that the connection reliability of the single line conductors 2, 2 with the connecting terminal 4 can be improved, thereby improving the reliability of the wiring material 1. In addition, the connecting operation can be automated, thereby improving the productivity of the wiring material 1.

(4) The electrical bonding property and the connection strength between the single line conductors 2, 2 and between the single line conductors 2, 2 with the tube-shaped section 5 can be improved by fusion bonding of the Sn-plating.

(5) By conducting crushing process and heating process to plastically deform the connecting terminal 4 and the single line conductors 2, 2, the pressure connection therebetween can be realized.

The wiring material in this preferred embodiment is explained as to the case where a configuration of the pressure connection mark 8 is a cylindrical concave portion (substantially circular in a plan view), however, the present invention is not limited thereto. For example, the configuration of the pressure connection mark may be different from the configuration of the electrode.

The Second Preferred Embodiment

Structure of Wiring Material

Figure 9:
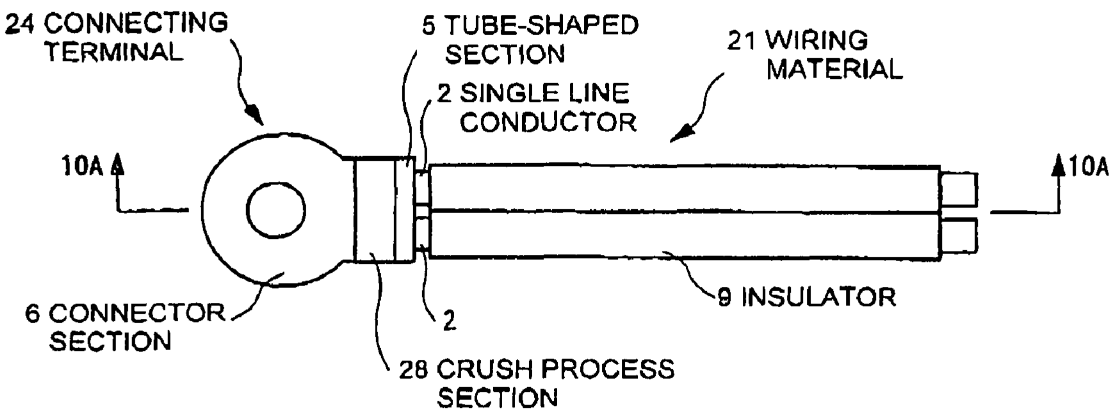
FIG. 9 is a plan view of a wiring material in a second preferred embodiment according to the present invention.
Figure 10:
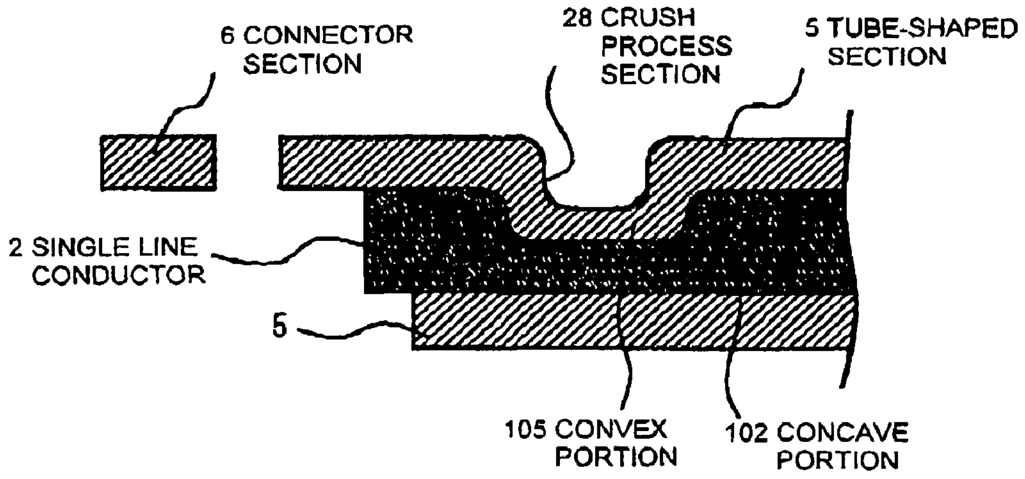
FIG. 10 is a cross sectional view of the wiring material cut along 10A-10A line of FIG. 9 (only the cross section is shown)

Based on FIGS. 9 and 10, a structure of a wiring material in the second preferred embodiment will be explained. FIG. 9 is a plan view of the wiring material in the second preferred embodiment according to the present invention. In addition, FIG. 10 is a cross sectional view of the wiring material cut along 10A-10A of FIG. 9 (only the cross section is shown).

A wiring material 21 in this preferred embodiment comprises a pressure connection mark (crush process section) 28 with a rectangular shape in a plan view, which is made by conducting the crush process on the tube-shaped section 5 of the connecting terminal 24, along a direction perpendicular to a longitudinal direction (axial direction) of the single line conductors 2, 2. In more concrete, the pressure connection mark (crush process section) 28 is a concave portion which presents a rectangular body shape. The concave portion (crush process section) 28 is extended along the direction perpendicular (or almost perpendicular, for example, inclined) to the longitudinal direction of the single line conductor 2. For example, the pressure connection mark may be a concave portion which presents a substantially ellipse cylindrical shape (substantially ellipse shape in a plan view). The other structure is similar to that of the wiring material in the first preferred embodiment.

(Manufacturing Method of the Wiring Material)

Figure 11:
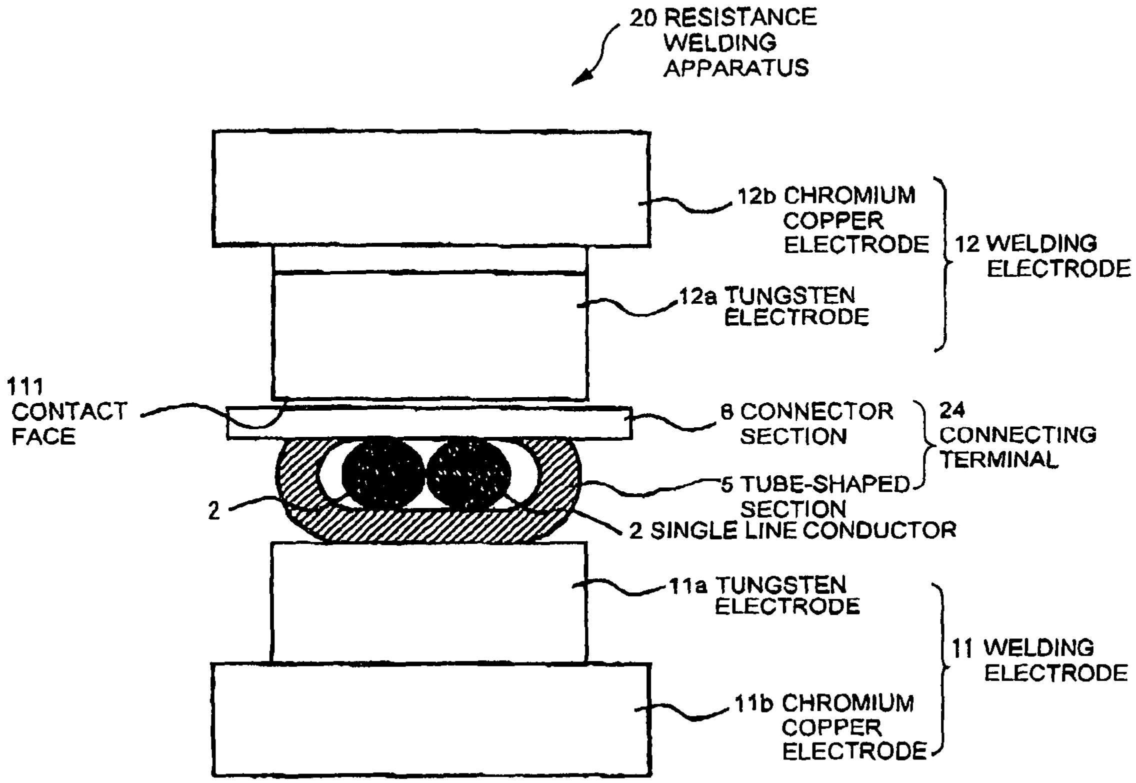
FIG. 11 is a front view of the resistance welding apparatus used for manufacturing the wiring material in the second preferred embodiment.

Next, the manufacturing method of the wiring material in the second preferred embodiment (resistance welding process) will be explained with referring to FIGS. 11 and 12. FIG. 11 is a front view of the resistance welding apparatus used for manufacturing the wiring material in the second preferred embodiment, and FIG. 12 is a side view thereof.

The manufacturing method of the wiring material 21 in this preferred embodiment is similar to the manufacturing method of the wiring material 1 in the first preferred embodiment, however, there is a difference in the resistance welding apparatus to be used.

Figure 12:
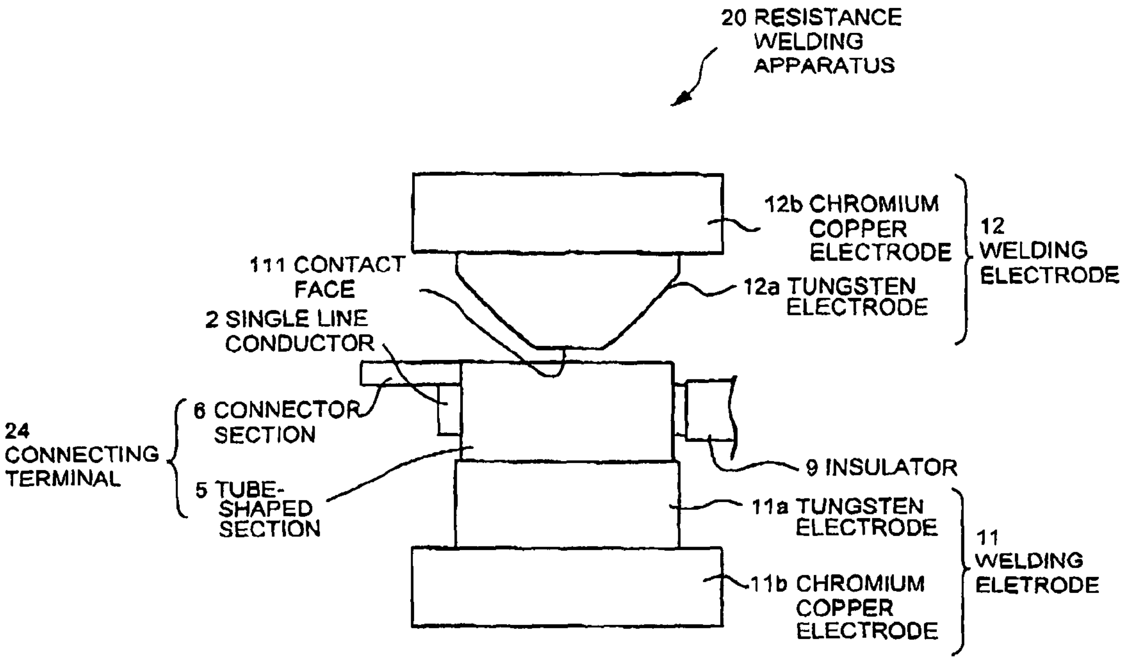
FIG. 12 is a side view of the resistance welding apparatus of FIG. 11.

As shown in FIGS. 11 and 12, a contact surface (hereinafter, referred as "contact face") 111 with the tube-shaped section 5 in an upper welding electrode 12 of the resistance welding apparatus 20 is formed to be approximately rectangular. The welding electrode 12 is for example made by scraping off both sides of a bottom part of a cylindrical electrode 11 shown in FIGS. 7 and 8. Hereinafter, a longitudinal direction of the approximately rectangular contact face 111 (the horizontal direction in FIG. 11 and a direction perpendicular to the drawing in FIG. 12) is assumed as a longitudinal direction of the electrode.

The welding electrode 12 is disposed such that the longitudinal direction of this welding electrode 12 is along with a direction orthogonal to a longitudinal direction (axial direction) of the single line conductors 2, 2. The electrode 12 is applied to the tube-shaped section 5 and pressurized, and the tube-shaped section 5 is crushed along with a direction orthogonal to the longitudinal direction of the single line conductors 2, 2 and the welding electrode 12 is energized simultaneously, so that the processed part is joined by the resistance welding.

Effect of this Preferred Embodiment

According to the preferred embodiment of the present invention as described above, the following effects are obtained other than the effect same as that in the first preferred embodiment.

(1) In this preferred embodiment, a contact area between the electrode 12 and the tube-shaped section 5 is reduced, and the contact resistance is increased. Therefore, the heat is easily generated between the electrode 12 and the tube-shaped section 5 by a relatively small current.

(2) In this preferred embodiment, by reducing the contact area between the electrode 12 and the connecting terminal 24 (tube-shaped section 5), the resistance welding can be realized by a small current. Therefore, the manufacturing cost of the wiring material 1 can be reduced. When the resistance welding is conducted by a small current and the resistance heat of the electrode 12 in itself is used, the calorific power can be controlled, and it is possible to prevent the insulation coating from melting due to the heat.

(3) In this preferred embodiment, by conducting the crush process in the direction perpendicular to the longitudinal direction of the single line conductors 2, 2, a concave portion 102 formed at the single line conductor 2 as shown in FIG. 10 is engaged with a convex portion 105 formed at the tube-shaped section 5, so that the single line conductors 2, 2 are hard to fall out from the connecting terminal 24.

The Third Preferred Embodiment

Figure 13:
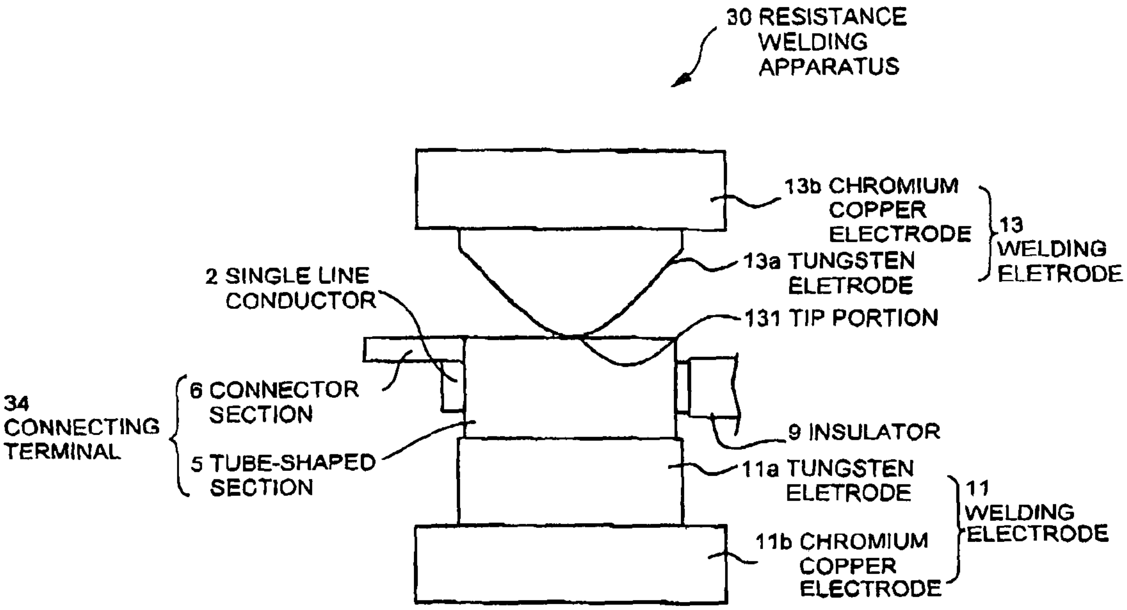
FIG. 13 is a side view of the resistance welding apparatus used for manufacturing the wiring material in a third preferred embodiment according to the present invention.

Based on FIGS. 14 and 15, a structure of a wiring material in the third preferred embodiment will be explained. FIG. 13 is a side view of the resistance welding apparatus used for manufacturing the wiring material in the third preferred embodiment.

In this preferred embodiment, a welding electrode 14 having a curved contact face is used. In more concrete, by rounding off the corners of a portion contacting with the connecting terminal 24 of the welding electrode 12 as shown in FIGS. 11 and 12 (in other words, respective sides of the approximately rectangular contact face are provided with curvatures), a tip portion 131 of the welding electrode 14 is formed to be a round-shape. By this process, a bottom of the pressure connection mark (not shown) has a curved surface configuration in which the corners are rounded off.

Effect of this Preferred Embodiment

According to this preferred embodiment of the present invention as described above, the following effects are obtained other than the effects same as those of the first and second preferred embodiments.

(1) In this preferred embodiment, the contact area between the welding electrode 14 and the connecting terminal 24 is smaller than that in the second preferred embodiment, so that the resistance welding can be conducted by a smaller current value.

(2) The corners of the pressure connection mark formed at the connecting terminal 24 can be rounded off, by providing the tip portion 131 of the welding electrode 14 with a round shape. As a result, in the case where for example a stress is applied along the longitudinal direction of the wiring material, the stress is hard to concentrate on the pressure connection mark portion (the crush process section).

The Fourth Preferred Embodiment

Structure of the Wiring Material

Based on FIGS. 14 and 15, a structure of a wiring material in the fourth preferred embodiment will be explained. FIG. 14 is a plan view of the wiring material in the fourth preferred embodiment according to the present invention. In addition, FIG. 15 is a cross sectional view of the wiring material cut along 15A-15A of FIG. 14 (only the cross section is shown).

In a wiring material 41 in this preferred embodiment, the crush process is conducted such that an upper surface of the tube-shaped section 5 of a connecting terminal 44 located between the single line conductors 2, 2 is in contact with a concave portion formed between the single line conductors 2, 2, and in contact along the longitudinal direction of the single line conductors 2, 2. In other words, the pressure connection mark (crush process section) 48 in this variation is a concave portion extended along the longitudinal direction of the single line conductor. Configuration of the concave portion is not limited. The other structure is similar to that of the wiring material in the first preferred embodiment.

(Manufacturing Method of the Wiring Material)

Figure 16:
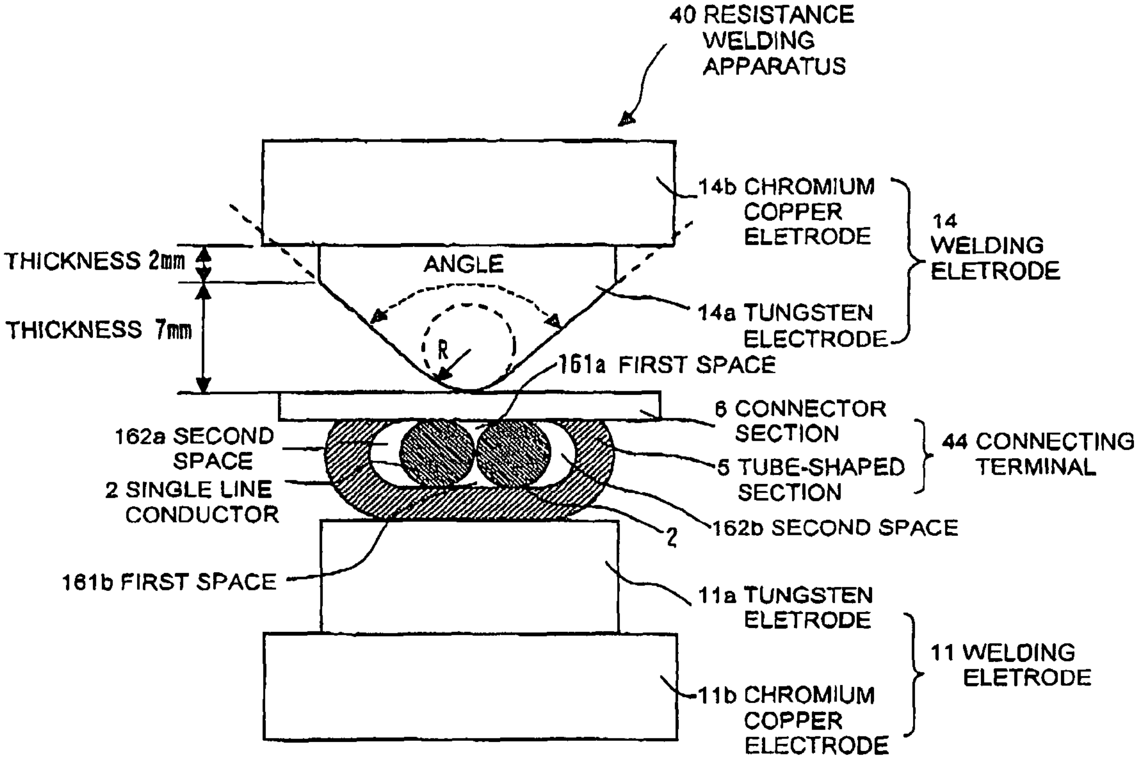
FIG. 16 is a front view of the resistance welding apparatus used for manufacturing the wiring material in the fourth preferred embodiment.
Figure 17:
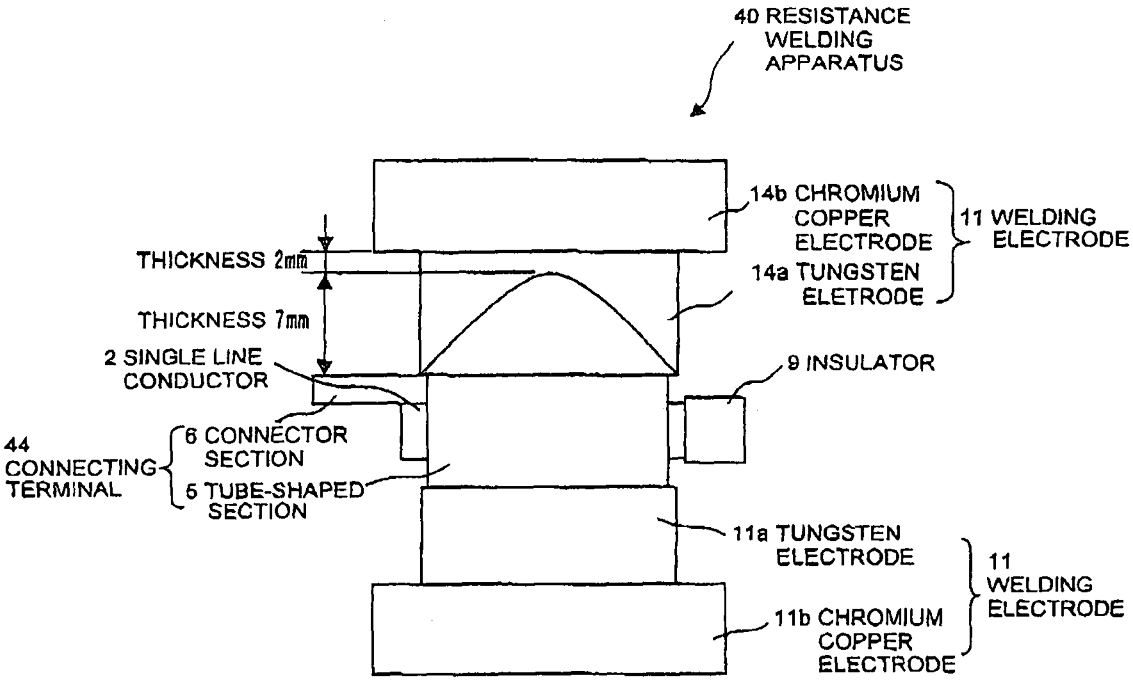
FIG. 17 is a side view of the resistance welding apparatus of FIG. 16.

Next, the manufacturing method of the wiring material in the fourth preferred embodiment (resistance welding process) will be explained with referring to FIGS. 16 and 17. FIG. 16 is a front view of the resistance welding apparatus used for manufacturing the wiring material in the second preferred embodiment, and FIG. 17 is a side view thereof.

The manufacturing method of the wiring material 41 in this preferred embodiment is similar to the manufacturing method of the wiring material 1 in the first preferred embodiment, however, there is a difference in the resistance welding apparatus to be used.

In concrete, an upper welding electrode is an electrode with a rectangular tip portion, and a resistance welding apparatus in which a direction of the upper welding electrode in the resistance welding apparatus to be used for manufacturing the wiring material in the third preferred embodiment is changed (turned with 90°), is used.

In this preferred embodiment, the welding electrode 14 is disposed such that the longitudinal direction (the direction perpendicular to the drawing in FIG. 16, and the horizontal direction in FIG. 16) of the welding electrode 14 is aligned with the longitudinal direction of the single line conductors 2, 2. The connecting terminal 44 is positioned such that the contact face of the welding electrode 14 is located between the single line conductors 2, 2.

By conducting the resistance welding as described above, the crush process is conducted such that an upper surface of the tube-shaped section 5 of the connecting terminal 44 located between the single line conductors 2, 2 is in contact with an upper concave portion (first space) 161*a* formed between the single line conductors 2, 2, and in contact along the longitudinal direction of the single line conductors 2, 2. In more concrete, an upper surface and a lower surface of the tube-shaped section 5 deform plastically, and pushed into the first spaces 161*a*, 161*b* formed between the tube-shaped section 5 and the respective single line conductors 2. Further, the respective single line conductors 2 are pressed to the longitudinal direction of the tube-shaped section 5 (the horizontal direction in FIG. 16) by the pushed tube-shaped section 5, and the respective single line conductors 2 are pushed into second spaces 162*a*, 162*b* formed between the tube-shaped section 5 and the respective single line conductors 2.

As for the configuration of the upper welding electrode, when a tip angle is 60° to 90°, and the round-shape of the tip portion is in a range of R1.25 mm to R3 mm, it is possible to realize a good connection. When the tip angle and the round-shape at the tip portion are out of these ranges, the terminal will be excessively crushed or insufficiently crushed, so that it is not possible to realize the good connection. When the tip angle is smaller than 60°, or the round-shape at the tip portion is smaller than R1.25 mm, the terminal will be excessively crushed and cut off by pressure. Further, when the tip angle of the electrode is greater than 90° or the R-shape at the tip portion is greater than R3 mm, the terminal will not be crushed and generate the heat, so that there is a problem in that the insulation coating material of the conductor will melt. Only the lower welding electrode may have a configuration with the aforementioned angle and round-shape while the upper welding electrode may not, or both the upper and lower welding electrodes may have the configuration with the aforementioned angle and round-shape.

Effect of this Preferred Embodiment

According to this preferred embodiment of the present invention as described above, the following effects are obtained other than the effects similar to those of the first to third preferred embodiments (partially not similar thereto).

(1) In this preferred embodiment, the contact area between the tube-shaped section 5 and the single line conductors 2, 2 can be increased more than the first to third preferred embodiments.

(2) An elongation of the connecting terminal 4 along the longitudinal direction of the single line conductor 2 can be reduced when the connecting terminal 4 deforms by the crush process. It is advantageous in particular when the precision in dimensions is required.

The Fifth Preferred Embodiment

Structure of the Wiring Material

Figure 18:
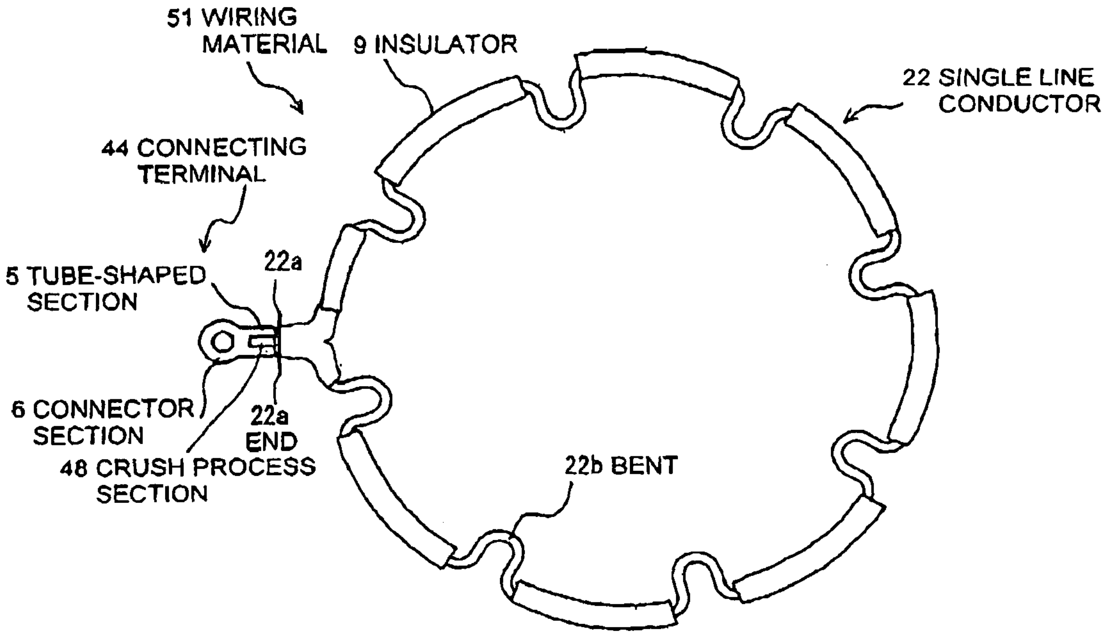
FIG. 18 is a plan view of a wiring material in the fifth preferred embodiment according to the present invention.

Based on FIG. 18, a structure of a wiring material in the fifth preferred embodiment will be explained. FIG. 18 is a plan view of the wiring material in the fifth preferred embodiment according to the present invention.

This preferred embodiment is different from the first to fourth preferred embodiments in the structure of the single line conductor, and has a configuration similar to the third preferred embodiment except the structure of the single line conductor. Therefore, same elements are indicated by same reference numerals, and the detailed explanations are omitted. Although a plurality of (two) single line conductors are used in the first to fourth preferred embodiments, one single line conductor is intended in this preferred embodiment.

The wiring material in this preferred embodiment is used, for example, as a wiring material for a motor having a plurality of stator coils disposed with an interval in a circumferential direction, as described in the background of the Invention.

As shown in FIG. 18, a wiring material 51 comprises a circular single line conductor 22 and a connecting terminal 44 electrically connected to the circular single line conductor 22.

The circular single line conductor 22 comprises both ends 22*a*, 22*a* extending in parallel. The both ends 22*a*, 22*a* are interposed in an inner periphery portion of a tube-shaped section 5 of the connecting terminal 44, and the connecting terminal 44 and the both ends 22*a*, 22*a* of the single line conductor 22 are electrically connected to each other by the resistance welding (via a resistance welding section).

In more concrete, the single line conductor 22 provided with an insulator 9 is formed in the shape of a circular ring, and the both ends 22*a*, 22*a* of the single line conductor 22 extend to outside along a radial direction. The single line conductor 22 is provided with a bent 22*b* which is bent inside along the radial direction. A plurality of bents 22*b* are provided along the circumferential direction corresponding to the respective stator coils. In the single line conductor 22, an insulator 9 is exfoliated at the both ends 22*a*, 22*a* and the bents 22*b*, so that the conductor is exposed.

In the wiring material 51, the both ends 22*a*, 22*a* of the single line conductor 22 are connected to a power feeding part (not shown) through the connecting terminal 44, and each bent 22*b* is connected to each enamel wire of each stator coil. Through the wiring material 51, a power is feed from the power feeding part to each enamel wire.

(Manufacturing Method of the Wiring Material)

Next, the manufacturing method of the wiring material 51 in this preferred embodiment will be explained.

The manufacturing method of the wiring material 51 in this preferred embodiment comprises steps of bending a single line conductor 22 to have a circular shape, extending both ends 22*a*, 22*a* of the single line conductor 22 that are bent in parallel, forming a tube-shaped section 5 in a connecting terminal 44 for accommodating the both ends 22*a*, 22*a* of the single line conductor 22 and interposing the both ends 22*a*, 22*a* of the single line conductor 22 into the tube-shaped section 5, and energizing the tube-shaped section 5 from its outer periphery in a state where an inner periphery surface of the tube-shaped section 5 contacts with the both ends 22*a*, 22*a* of the single line conductor 22 to electrically connect the connecting terminal 44 with the both ends 22*a*, 22*a* of the single line conductor 22.

At first, a single line conductor 22, which is formed by providing a Sn-plating on a copper or copper alloy wire then providing an insulation coating thereon, is prepared. An insulator 9 provided at regions corresponding to the both ends 22*a*, 22*a* and the bent 22*b* of the single line conductor is exfoliated.

Next, the single line conductor 22 is bent in the shape of a circular ring. Further, a plurality of bents 22*b* are formed at the single line conductor 22. Thereafter, the both ends 22*a*, 22*a* of the single line conductor 22 are extended in parallel to outside along the radial direction. The process of bending in the circular shape, the process of forming the bent 22*b*, and the process of extending the both ends 22*a*, 22*a* may be conducted independently or simultaneously.

Next, similarly to the preferred embodiments as described above, the tube-shaped section 5 for accommodating the both ends 22*a*, 22*a* provided in parallel is formed at the connecting terminal 44. Thereafter, similarly to the manufacturing method of the wiring material 1 in the first preferred embodiment, the connecting terminal 44 and the single line conductor 22 are connected by the resistance welding.

Two or three pieces of the wiring material 51 thus fabricated are integrated into one set in accordance with a phase number of the motor, and installed in the motor.

Effect of Preferred Embodiment

According to this preferred embodiment of the present invention as described above, the following effects are obtained other than the effects same as those in the first preferred embodiment.

(1) Since it is not necessary for soldering or conducting the TIG welding to connect the single line conductor 22 and the connecting terminal 44, there is no risk of generating cracks due to thermal fatigue or oscillation in a connecting part therebetween, and there is no problem of thermal effect on the connecting part or hydrogen embrittlement of a melting part.

(2) Since an insulation coating is provided on the wiring material, it is not necessary to provide a resin molding all over the wiring material in the case where a plurality of the wiring materials are integrated, so that the manufacturing process can be simplified.

Other Preferred Embodiments

The present invention is not limited to preferred embodiments, and several variations and applications may be expected.

For example, the Sn-plating may be provided on the tube-shaped section of the connecting terminal, and the Sn-plating layer may be formed at a contact portion with the single line conductor in an inner periphery surface of the tube-shaped section. According to this structure, the electrical bonding property between the single line conductor and the connecting terminal can be improved.

In addition, in the preferred embodiments as described above, the Sn-plating was provided, however the present invention is not limited thereto, and it is possible to provide for example, Ag-plating, Zn-plating, solder plating or the like.

Further, in the preferred embodiments as described above, the explanation is made in connection with the case where the crush process section is formed at an upper surface of the tube-shaped section, however the present invention is not limited thereto, for example, the crush process section may be formed at a lower surface or both the upper and lower surfaces of the tube-shaped section. Further, a plurality of crush process sections may be formed.

In addition, the welding electrode used for the resistance welding is not limited to a cylindrical electrode, and various configurations may be used. For example, a quadratic prism-shaped electrode and a processed quadratic prism-shaped electrode may be used.

Further, a material of the welding electrode is not limited to tungsten, and for example molybdenum may be used.

Still further, the welding electrode is not limited to the configuration in which the tungsten electrode is buried in the chromium copper electrode, and the configuration in which the tungsten electrode is directly fixed to a holder of the copper electrode may be used.

In addition, a PFA coating material is used as an insulator of the single line conductor however the present invention is not limited thereto. For example, when the single line conductor is employed as the wiring material of the motor, an enamel coating material may be provided thereon as an insulator.

Further, the tube-shaped section of the connecting terminal may be formed to have an elliptical shape, such that the tube-shaped section of the connecting terminal contacts two single line conductors or both ends of the circular single line conductor respectively, when the tube-shaped section of the connecting terminal accommodates the two single line conductors or the both ends of two single line conductor.

Example 1

Next, examples of the wiring material in the fourth preferred embodiment and comparative examples are shown. The wiring materials in the examples 1 to 8 and the comparative examples 1 to 4 were manufactured, and a presence of a connecting terminal breaking, a presence of melting of an insulation coating, and a connection reliability were evaluated.

Example 1

A Sn-plating with a thickness of 0.5 μm was provided on a copper wire with a diameter of 2.6 mm, and an insulator (PFA) with a thickness of 0.3 mm was provided thereon as an insulation coating. The insulator at a tip portion of this insulation coated copper wire was peeled off along a length of 13 mm to expose the copper wire, to provide a Sn-plated copper wire (single line conductor) 2.

Next, a copper plate with a thickness of 1.0 mm was press-molded to provide a terminal tapered configuration and bent to form a part (tube-shaped section 5) for gripping the single line conductor 2, then a matching part was brazed to form a terminal barrel section with a true circle cross section having an opening with a diameter of 3.4 mm, and a terminal face was Sn-plated. By conducting the press-molding on the above device, a connecting terminal 44 comprising copper with an approximately oval cross section was formed.

Two Sn-plated copper wires (single line conductors) 2 were arranged in parallel, and interposed through the opening of a pipe-shaped member (tube-shaped section 5) into the inside thereof. The connecting terminal 44 in to which the Sn-plated copper wires (single line conductors) 2 are interposed was positioned with respect to upper and lower electrodes of the resistance welding apparatus 40. At this time, the electrodes are located such that a longitudinal direction of an upper welding electrode 14 is matched with a longitudinal direction of the Sn-plated copper wires (single line conductors) 2, and the connecting terminal 44 was positioned such that a contact face of the welding electrode 14 is located between the two Sn-plated copper wires (single line conductors) 2.

The upper welding electrode 14 of the resistance welding apparatus 40 that was employed comprises a circular bottom surface with a diameter of f 10 mm, a tungsten electrode **14*a* with a total thickness (height) of 9 mm (comprising a cylindrical part with a thickness of 2 mm and a tip portion with a thickness of 7 mm, an round-shape of 1.25 at its tip portion, and an electrode angle of 60° to be concrete), and a chromium copper electrode 14*b* with a cylindrical shape. A lower welding electrode 11 comprises a tungsten electrode 11*a* with a flat cylindrical shape, and a chromium copper electrode 11*b***.

Thereafter, the connecting terminal 44 was sandwiched by the upper and lower electrodes, and the connecting terminal 44 was energized at a current of 5.8 kA for 2 seconds by these electrodes while pressurizing the connecting terminal 44 by a welding force of 4 kN. The wiring material having a pressure connection mark (crush process section) at an upper surface of the connecting terminal 44, which extends along a longitudinal direction of the Sn-plated copper wires (single line conductors) 2 (crush process section), was thus completed.

Figure 14:
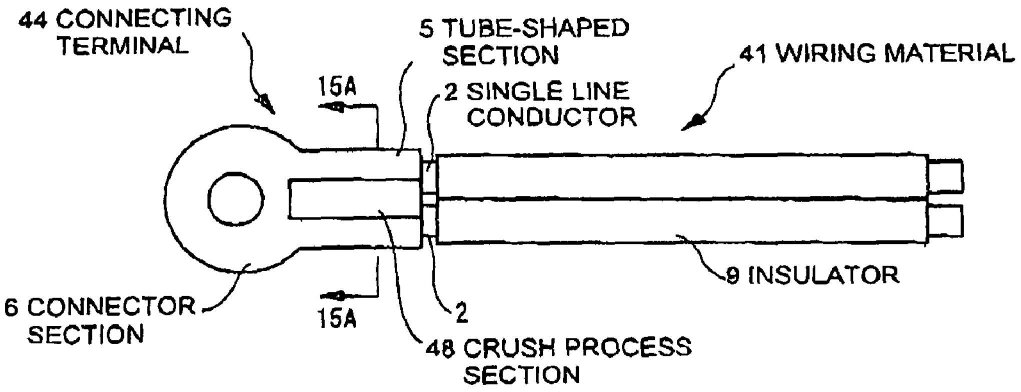
FIG. 14 is a plan view of a wiring material in a fourth preferred embodiment according to the present invention.
Figure 15:
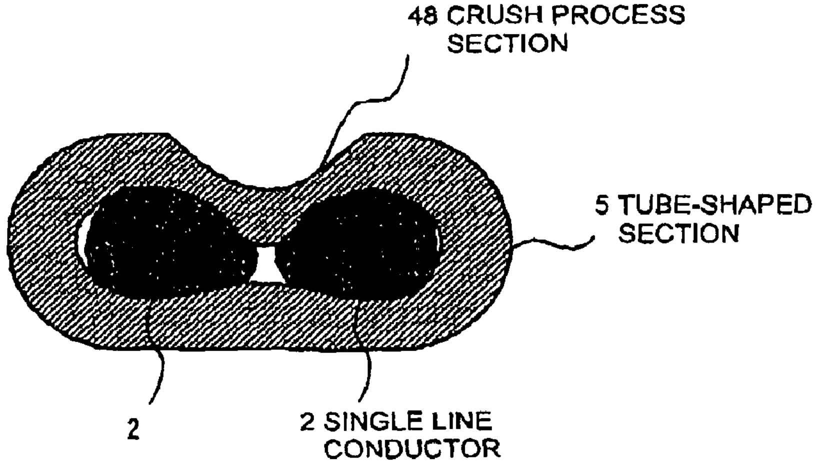
FIG. 15 is a cross sectional view of the wiring material cut along 15A-15A line of FIG. 14 (only the cross section is shown)
Figure 19:
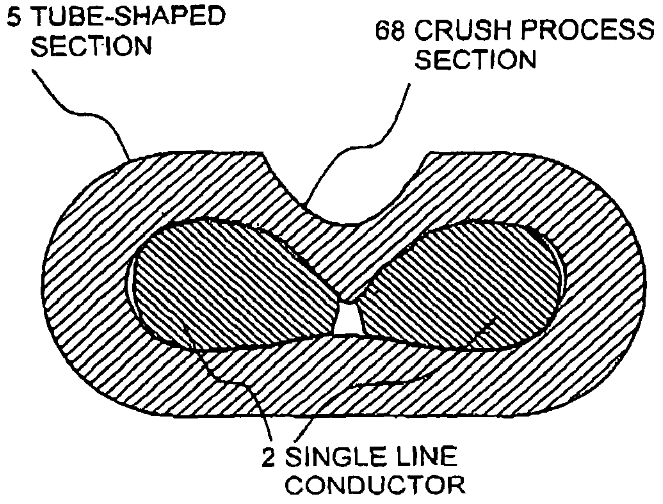
FIG. 19 is a cross sectional view of the wiring material cut along 15A-15A of FIG. 14, when a round-shape at a tip portion of an upper welding electrode has a radius of 1.25 mm and a tip electrode angle is 60° (only the cross section is shown)

Herein, FIG. 19 is a cross sectional view of the wiring material cut along 15A-15A of FIG. 14, when a round-shape at a tip portion of an upper welding electrode 14 has a radius of 1.25 mm and a tip electrode angle is 60° (only the cross section is shown)

Example 2

The wiring material was completed under conditions same as those of Example 1 except that the round-shape at the tip portion of the upper welding electrode 14 had a radius of 1.5 mm, and the electrode angle was 70°.

Example 3

The wiring material was completed under conditions same as those of Example 1 except that the round-shape at the tip portion of the upper welding electrode 14 had a radius of 1.75 mm, and the electrode angle was 75°.

Example 4

The wiring material was completed under conditions same as those of Example 1 except that the round-shape at the tip portion of the upper welding electrode 14 had a radius of 2.0 mm, and the electrode angle was 80°.

Example 5

The wiring material was completed under conditions same as those of Example 1 except that the round-shape at the tip portion of the upper welding electrode 14 had a radius of 2.5 mm, and the electrode angle was 85°.

Example 6

Figure 20:
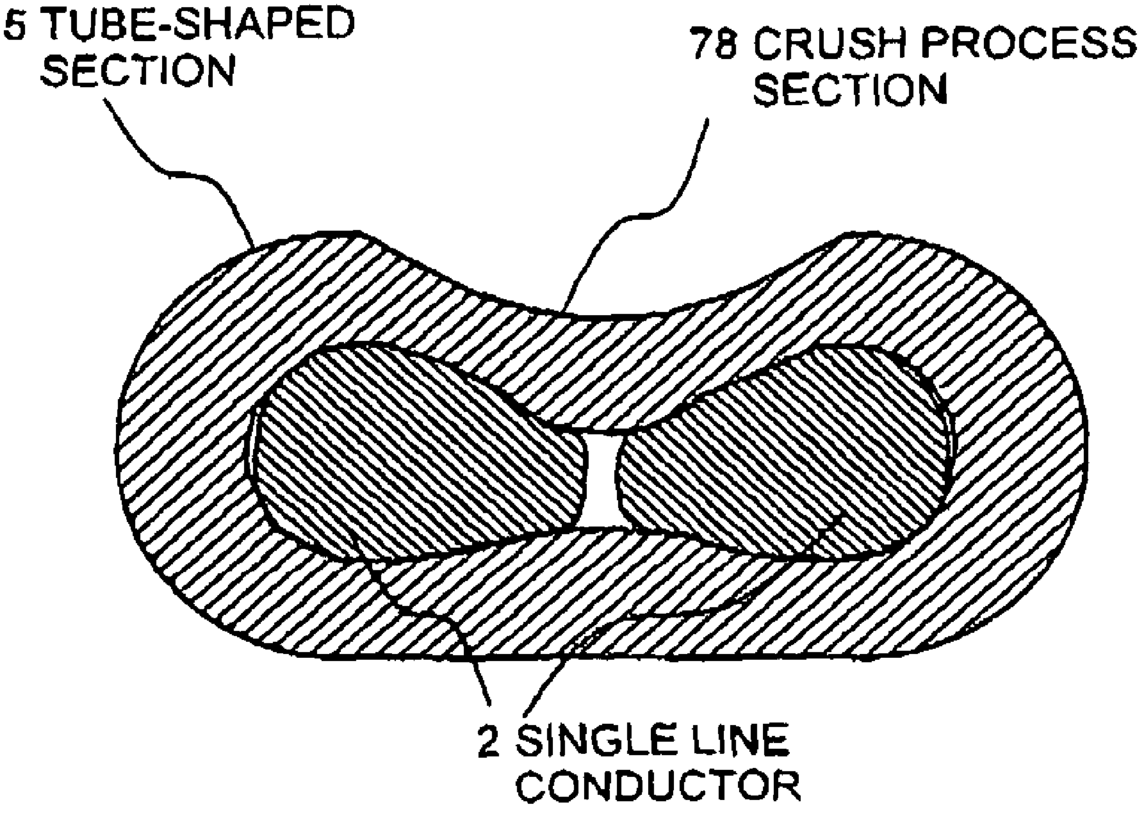
FIG. 20 is a cross sectional view of the wiring material cut along 15A-15A of FIG. 14, when a round-shape at a tip portion of an upper welding electrode has a radius of 3.0 mm and a tip electrode angle is 90° (only the cross section is shown).

The wiring material was completed under conditions same as those of Example 1 except that the round-shape at the tip portion of the upper welding electrode 14 had a radius of 3.0 mm, and the electrode angle was 90°. In addition, FIG. 20 is a cross sectional view of the wiring material cut along 15A-15A of FIG. 14, when a round-shape at a tip portion of a welding electrode at un upper side has a radius of 3.0 mm and a tip electrode angle is 90° (only the cross section is shown).

Example 7

The wiring material was completed under conditions same as those of Example 1 except that the round-shape at the tip portion of the upper welding electrode 14 had a radius of 3.0 mm, and the electrode angle was 60°.

Example 8

The wiring material was completed under conditions same as those of Example 1 except that the round-shape at the tip portion of the upper welding electrode 14 had a radius of 1.25 mm, and the electrode angle was 90°.

Comparative Example 1

The wiring material was completed under conditions same as those of Example 1 except that the round-shape at the tip portion of the upper welding electrode 14 had a radius of 1.0 mm, and the electrode angle was 60°.

Comparative Example 2

The wiring material was completed under conditions same as those of Example 1 except that the round-shape at the tip portion of the upper welding electrode 14 had a radius of 3.25 mm, and the electrode angle was 60°.

Comparative Example 3

The wiring material was completed under conditions same as those of Example 1 except that the round-shape at the tip portion of the upper welding electrode 14 had a radius of 1.5 mm, and the electrode angle was 55°.

Comparative Example 4

The wiring material was completed under conditions same as those of Example 1 except that the round-shape at the tip portion of the upper welding electrode 14 had a radius of 1.5 mm, and the electrode angle was 95°.

(Presence of the Connecting Terminal Breaking)

As described above, a connecting terminal was prepared as follows: a copper plate is press-molded to provide a terminal tapered configuration, bent to form a part (tube-shaped section) for gripping the single line conductor, then a matching part was brazed to form a terminal barrel section with a true circle cross section. At the time of welding, a brazing point of the connecting terminal is disposed on the lower electrode, however, a force acts on the brazing point in accordance with plastic deformation of the tube-shaped section, so that the brazing point is exfoliated, thereby causing the breaking of the connecting terminal. Even when a little breaking is occurred, it is evaluated as "yes".

(Presence of Melting of the Insulation Coating)

When a melting is occurred in the insulation coating material of the single line conductor due to the heat generation of the connecting terminal, it is evaluated as "yes".

(Connection Reliability)

The wiring material having a good in which an upper portion of the connecting terminal (tube-shaped section) contacts with a concave portion formed between the two single line conductors and contacts along the longitudinal direction of the single line conductors is evaluated as "Good", and the wiring material in which a contacting area is not sufficient (i.e. there are many separated portions) is evaluated as "Bad".

(Overall Evaluation)

The overall evaluation is made as follows: ○ indicates that no problem is found in the evaluation results for three items, Δ indicates that a problem is found in the evaluation result for one item, and X indicates that problems are found in the evaluation results for two or more items.

TABLE 1

| | Condition | | Evaluation results | | | |
|---|---|---|---|---|---|---|
| | Electrode Angle | Tip portion round-shape (mm) | Presence of Connecting Terminal Breaking | Presence of Melting of Coating | Connection Reliability | Overall Evaluation |
| Example 1 | 60° | R1.25 | No | No | Good | ○ |
| Example 2 | 70° | R1.5 | No | No | Good | ○ |
| Example 3 | 75° | R1.75 | No | No | Good | ○ |
| Example 4 | 80° | R2.0 | No | No | Good | ○ |
| Example 5 | 85° | R2.5 | No | No | Good | ○ |
| Example 6 | 90° | R3.0 | No | No | Good | ○ |
| Example 7 | 60° | R3.0 | No | No | Good | ○ |
| Example 8 | 90° | R1.25 | No | No | Good | ○ |
| Comparative Example 1 | 60° | R1.0 | Yes | No | Bad | X |

TABLE 1-continued

| | Condition | | Evaluation results | | | |
|---|---|---|---|---|---|---|
| | Electrode Angle | Tip portion round-shape (mm) | Presence of Connecting Terminal Breaking | Presence of Melting of Coating | Connection Reliability | Overall Evaluation |
| Comparative Example 2 | 60° | R3.25 | No | Yes | Good | Δ |
| Comparative Example 3 | 55° | R1.5 | Yes | No | Bad | X |
| Comparative Example 4 | 95° | R1.5 | No | Yes | Good | Δ |

As shown in Table 1, it is found that each of the wiring materials in the Examples 1 to 8 according to the present invention has a no connecting terminal breaking, no melting of the insulation coating, and a good connecting structure in which the upper portion of the connecting terminal (tube-shaped section) contacts with the concave portion formed between the two single line conductors and contacts along the longitudinal direction of the single line conductors.

On the other hand, in the Comparative example 1 and the Comparative example 2, the round-shape at the tip portion of the electrode is out of a predetermined range according to the present invention. When a value of the round-shape at the tip portion is small (R1.0), the connecting terminal is such crushed that the connecting terminal is cut down. When the value of the round-shape at the tip portion is large (R3.25), the connecting terminal does not plastically deform, and the contact area between the electrode and the connecting terminal is reduced, so that the connecting terminal generates the heat, thereby melting the insulation coating material of the connecting terminal.

Further, in the Comparative example 3 and the Comparative example 4, the electrode angle is out of a predetermined range. When a value of the electrode angle is small (55°), the connecting terminal is such crushed that the connecting terminal is cut down. When the value of the electrode angle is large (95°), the connecting terminal does not plastically deform, and the contact area between the electrode and the connecting terminal is reduced, so that the connecting terminal generates the heat, thereby melting the insulation coating material of the connecting terminal.

Therefore, as for the electrode configuration, it is found that the electrode terminal is not broken and the insulation coating does not melt as well as a good connection reliability can be obtained, when the tip angle is within a range of 60° to 90° and the round-shape at the tip portion is within a range of R1.25 mm to R3 mm.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

INDUSTRIAL APPLICABILITY

According to the present invention, it is possible to provide a wiring material in which the bonding property of the connector section between the single line conductor and the connecting terminal is uniform, and that has a high connection reliability.

What is claimed is:

1. A method of manufacturing a wiring material having a connecting terminal electrically connected to two single line conductors provided in parallel, comprising the steps of:

forming a tube-shaped section for accommodating the two single line conductors at the connecting terminal;

inserting the two single line conductors into the tube-shaped section having a circular cross section; and conducting a resistance welding by energizing a pair of welding electrodes, at least one of the welding electrodes having a round-shaped tip portion, from an outer periphery of the tube-shaped section having the circular cross section to electrically connect the connecting terminal with the two single line conductors, in a state where a part of the tube-shaped section located between the two single line conductors is pushed by the welding electrode having the round-shaped tip portion into a space formed between the two single line conductors such that an inner periphery portion of the tube-shaped section and the single line conductors are in contact with each other.

2. The method of manufacturing a wiring material according to claim 1, wherein:

the resistance welding is conducted by energizing by a pair of electrodes from the outer periphery of the tube-shaped section, and a tip angle of any one or both of the pair of the electrodes is from 60° to 90°.

3. The method of manufacturing a wiring material according to claim 2 wherein:

a round-shape at a tip portion of any one or both of the pair of the electrodes is from 1.25 mm to 3 mm.

4. The method of manufacturing a wiring material according to claim 1, further comprising:

conducting a crush process on the tube-shaped section of the connecting terminal, wherein the crush process is conducted such that an upper portion of the tube-shaped section of the connecting terminal contacts with a concave portion formed between the two single line conductors and contacts along a longitudinal direction of the two single line conductors.

* * * * *